(12) United States Patent
Nyce

(10) Patent No.: US 6,647,780 B1
(45) Date of Patent: Nov. 18, 2003

(54) SLOW WAVE STRUCTURE SENSOR WITH ZERO-BASED FREQUENCY OUTPUT

(75) Inventor: David S. Nyce, Apex, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 10/146,380

(22) Filed: May 15, 2002

(51) Int. Cl.[7] .............................................. G01F 23/00

(52) U.S. Cl. ..................................... 73/290 R; 324/602

(58) Field of Search ........................ 73/290 R; 324/600, 324/602, 605, 609, 629, 637, 639

(56) References Cited

U.S. PATENT DOCUMENTS

| 3,829,764 A | * | 8/1974 | Bosisio | 324/632 |
| 5,819,582 A | * | 10/1998 | Kelly | 73/290 R |
| 6,018,247 A | * | 1/2000 | Kelly | 324/644 |

* cited by examiner

Primary Examiner—Richard A. Moller
(74) Attorney, Agent, or Firm—David M. Ostfeld

(57) ABSTRACT

An oscillating circuit is disclosed which is responsive to frequency variations caused by parameter changes in an associated slow wave structure sensitive element. A local oscillator and mixer circuit is used to subtract an offset frequency output to reset the oscillation frequency of the slow wave structure so that the output frequency will be in a range starting substantially at zero.

17 Claims, 1 Drawing Sheet

SLOW WAVE STRUCTURE SENSOR WITH ZERO-BASED FREQUENCY OUTPUT

BACKGROUND OF THE INVENTION

1. Field of the Invention

The invention relates to slow wave structures and more particularly to slow wave structures which are used as feedback elements in oscillator-type circuits.

2. Background of the Invention

The usefulness of RF or microwave means for monitoring liquid level is recognized by the prior art. Such devices can operate with either RF or microwave excitation. When an electromagnetic field is excited in a container partially filled with liquid, parameters of the electromagnetic field, such as resonant frequency, vary with the level of the liquid. In particular, the state of the art is shown in V. A. Viktorov "Microwave Method of Level Measurement", *The Resonance Method of the Level Measurement, Moscow: Energija*. 1987, disclosing an electrodynamic element, made as a section of a long line, inserted into a monitored container where the resonant frequency is measured.

A general discussion, see Viktorov V. A., Lunkin B. V., Sovlukov A. S. "Method of and Apparatus for Level Measurement by Hybrid Electromagnetic Oscillation Excitation", *Radio-Wave Measurements, Moscow: Energoatomizdat*, 1989, states that an electrodynamic element is placed in a monitored container, and the element's resonant frequency has a direct correlation to the level of liquid within the container.

Slowed electromagnetic waves and slow-wave structures are also well known in the field of microwave engineering, see J. R. Pierce, "Traveling-Wave Tubes" D. Van Nostrand Company, Inc., Princeton, N.J., 1950. These waves are electromagnetic waves propagating in one direction with a phase velocity $v_p$ that is smaller than the velocity of light c in a vacuum. The relation $c/v_p$ is named slowing or deceleration and is designated as n. In most practical cases, slowed electromagnetic waves are formed in slow-wave structures by coiling one or two conductors (for example, into a helix, as shown in FIG. 1 of U.S. patent application Ser. No. 09/134,056, filed Aug. 14, 1998 (prior art) U.S. Pat. No. 6,293,142, where the other conductor is a cylinder), which increases the path length traveled by the wave, or by successively connecting resonant elements or cells, energy exchange between which delays the phase of the wave, or by using an electrodynamically dense medium (usually a dielectric), or a combination of these methods. Additional deceleration was also obtained due to positive electric and magnetic coupling in coupled slow-wave structures, see V. V. Annenkov, Yu. N. Pchelnikov "Sensitive Elements Based on Slow-Wave Structures" *Measurement Techniques*, Vol. 38, #12, 1995, pp. 1369–1375.

Slow-wave structure-based sensitive elements are known in the art, see Yu. N. Pchelnikov, I. A. Uvarov and S. I. Ryabtsev, "Instrument for detecting Bubbles in a Flowing Liquid", *Measurement Techniques*, Vol. 22, #5, 1995, pp.559–560, and Yu. N. Pchelnikov, "Possibility of Using a Cylindrical Helix to Monitor the Continuity of Media", *Measurement Techniques*, Vol. 38, #10, 1995, pp.1182–1184. The slowing of the electromagnetic wave leads to a reduction in the resonant dimensions of the sensitive elements and this enables one, by using the advantages of electrodynamic structures, to operate at relatively low frequencies, which are more convenient for generation and are more convenient for primary conversion of the information signal, but sufficiently large to provide high accuracy and high speed of response. The low electromagnetic losses at relatively low frequencies (a few to tens of megahertz) also helps to increase the accuracy and sensitivity of the measurements. The slowing of the electromagnetic wave leads also to energy concentration in the transverse and longitudinal directions, that results in an increase in sensitivity, proportional to the slowing factor n. See V. V. Annenkov, Yu. N. Pchelnikov "Sensitive Elements Based on Slow-Wave Structures" *Measurement Techniques*, Vol. 38, #12, 1995, pp. 1369–1375.

Most slow-wave structures were made as two-conductor periodic transmission lines (see Dean A. Watkins "Topics in Electromagnetic Theory", John Willy & Sons, Inc. Publishers). It is also possible to design a slow-wave structure which contains three or more different conductors. In all cases, the slowed wave is excited in the electrodynamic element between different combinations of the two conductors. The coiled conductors increasing the wave path are named "impedance conductors", and conductors with simple configuration such as rods, tapes, etc., stretched along the wave propagation direction are named "screen conductors", see V. V. Annenkov, Yu. N. Pchelnikov "Sensitive Elements Based on Slow-Wave Structures" *Measurement Techniques*, Vol. 38, #12, 1995, pp. 1369–1375.

Both the prior art and the present invention measure one or more parameters of an electromagnetic field. Some of the prior art methods and the present invention use an electrodynamic element, some are made as a resonant cavity filled with the liquid to be measured or made as an electrodynamic element placed in or outside a container. The electrodynamic element is connected to an external RF or microwave signal generator which is used to excite an electromagnetic field. The change in, for example, the level of the liquid, causes a shift in the characteristics of the electromagnetic field in the electrodynamic element. The shift in characteristics correlates to a change, for example, in the level of the liquid within the measured container.

Devices used in the prior art exhibit several problems which are overcome by the present invention. Previous methods depend upon the sensitivity of a measured parameter of an electromagnetic field to measure level displacement and provide signal resolution. Sensitivity and resolution increase with frequency. However, the increase in frequency is accompanied by an increase in electromagnetic losses, such losses causing a loss of accuracy of the measurement. Besides, it is known that the higher the frequency, the higher is the cost of electronics. The relatively low accuracy realized from the prior art is also due to resonant frequency dependence on the monitored liquid's electric parameters. Thus, there is a need in the art for an electromagnetic method and apparatus for monitoring liquid levels and other height measurements that has better sensitivity, better resolution, greater diversity and lower cost.

Accordingly, slow wave structures have been used as feedback elements in oscillator-type circuits in which the slow wave structure acts as a delay line or as a phase-shifting element. See V. V. Annenkov, Yu. N. Pchelnikov "Sensitive Elements Based on Slow-Wave Structures" *Measurement Techniques*, Vol. 38, #12, 1995, pp. 1369–1375. This paper also shows sensors which have been developed based on making sensitive elements which are designed as sections of a slow wave structure.

In prior art slow wave sensors, an oscillator frequency changes in response to a change in phase shift and/or change in delay time of the sensitive element of the slow wave structure. These changes are proportional in response to changes in the parameter being sensed, thereby allowing an output to be derived from the sensed parameter. The oscillator frequency changes plus or minus a percentage of a nominal frequency. However, these circuits require a nominal frequency which is difficult to change to a current or voltage output proportional to the change in frequency because of the high frequencies involved. For example, in the prior art slow wave structure sensor systems, the oscillating frequency would have a nominal frequency of ten megahertz and have a variation due to the sensed parameter such as plus or minus one megahertz. The resulting nine to eleven megahertz signal must then be conditioned into representative engineering units by additional hardware and/or software. This would, for example with hardware, include a frequency-to-voltage converter, a voltage-shifting circuit, and a variable gain amplifier. The analog voltage shifting circuit must be. carefully designed to avoid temperature sensitivity and maintain stability because the zero shift is usually a factor of several times greater than the signal level, e.g. nine megahertz plus or minus two megahertz.

It is an object of the present invention to avoid many of the elements required to make this conversion.

SUMMARY OF THE INVENTION

A sensor is disclosed having a slow wave structure used with an oscillating circuit and at a frequency determined by the associated slow wave structure sensitive element. The slow wave structure is positioned such that the oscillation frequency varies with the sensed parameter. A reference frequency is subtracted from the oscillator frequency, resulting in a frequency variation for the sensed parameter of near zero Hz to a full scale of one to two MHz. The zero frequency is accomplished through the use of a local oscillator and mixer circuit to subtract the offset frequency required by the oscillator circuit, such as ten megahertz. Thus, the resulting signal frequencies start from zero or near zero. Accordingly, the frequency would vary between zero and the range of the signal frequency, such as for example, two megahertz. A frequency-to-voltage converter could be easily used and scaled to provide a zero-to-five or zero-to-ten volt output proportional to that frequency. Alternatively, an offset such as 0.50 megahertz may be used so that the range would be 0.50 to 2.50 megahertz corresponding to the use of a frequency-to-current converter directly scalable to 4 to 20 milliamps. This permits the local oscillator to have a fixed frequency. Therefore it may be crystal controlled or ceramic filter controlled, resulting in a very stable frequency.

BRIEF DESCRIPTION OF THE DRAWINGS

For a further understanding of the nature and objects of the present invention, reference should be had to the following figure in which like parts are given like reference numerals and wherein.

DETAILED DESCRIPTION OF THE PREFERRED EMBODIMENT

Figure 1:
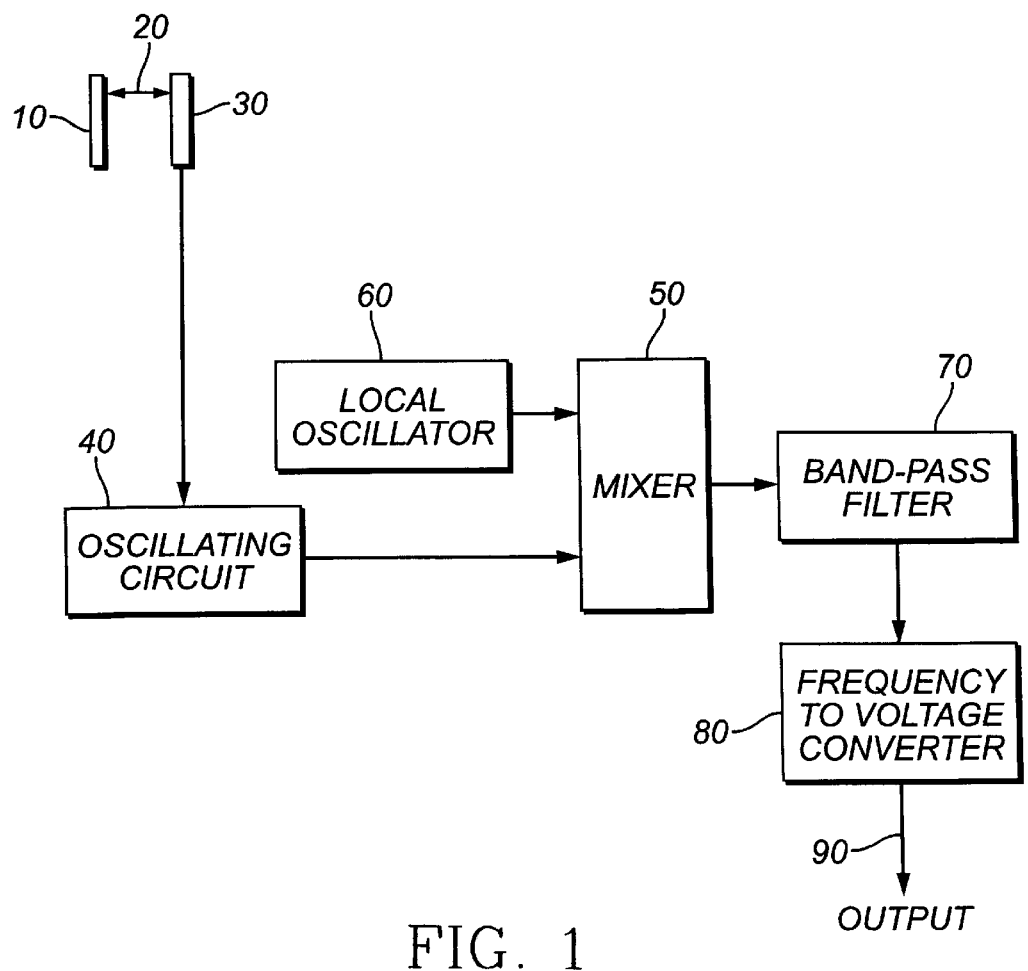
FIG. 1 is a schematic of the preferred embodiment of the present invention showing a distance measurement.

As shown in FIG. 1, there is a target 10 that is to be sensed. As indicated in FIG. 1, the distance 20 to the target 10 is to be measured, and this is done by a slow wave structure sensing element 30 juxtaposed to the target 10 with a distance 20 being the measurement between them. Measuring the distance from the target is only one illustration of an innumerable number of measurements that can be made with slow wave structures mounted in some way relative to the target. See, for example, U.S. patent application Ser. No. 09/134,056, filed Aug. 14,1998 U.S. Pat. No. 6,293,142, and U.S. patent application Ser. No. 09/379,840, filed Aug. 24,1999, and U.S. patent application Ser. No. 09/321,177, filed May 27, 1999, which are incorporated herein by reference ("Applications").

As is indicated in the Applications, the slow wave structure sensing element 30 is used as a feedback system a slow wave structure oscillating-type circuit 40. For example, the slow wave structure oscillating-type circuit 40 may connect to a delay line and a phase-shifting element 30 which is a slow wave structure. The sensor 30 from the oscillating circuit 40 may be developed using these sensitive elements which are designed as sections of slow wave structures. Thus, the frequency of the oscillating circuit 40 changes in response to a phase shift and/or change in delay time of the sensitive element 30 which is proportional to the response in the parameter 20 being sensed, thereby obtaining an output from the sensor 30 derived from the value of the sensed parameter 20 that is detected as the output of the oscillating circuit 40. Typically, the oscillator frequency of oscillating circuit 40 to which the slow wave structure sensitive element 30 is connected changes plus or minus a percentage of a nominal frequency. Typically, for the oscillating circuit 40, the oscillating frequency would have a nominal value such as, for example, 10 megahertz and have a variation due to the sensed parameter 20 such as plus or minus one megahertz as discussed above. The resulting nine to eleven megahertz signal is introduced into a mixer 50, which also has as another input a local oscillator 60 frequency. The local oscillator 60 and the mixer 50 are elements known in the art. Here they are used to subtract the offset frequency generated by the local oscillator 60 from the resulting signal frequencies of oscillating circuit 40. The resulting output from mixer 50 has as one component a set of frequencies that start from zero or near zero. In the example set out above, nine megahertz would be the oscillator signal from local oscillator 60 and would be subtracted from the nine to eleven megahertz signal frequency to result in a zero to two megahertz signal frequency component from mixer 50. Alternatively, again using the example of nine to eleven megahertz set out above, local oscillator 60 might generate a frequency of 8.5 megahertz which the mixer 50 would use with the nine to eleven megahertz signal to result in a component of the output of the mixer 50 of 0.50 to 2.50 megahertz signal frequency.

The signal from local oscillator 60 may have a fixed frequency, and therefore be crystal-controlled or ceramic-filter controlled. This results in a very stable frequency shift through the mixer 50 and a very stable "zero" frequency. Local oscillator 60 may also be an R/C filter controlled local oscillator.

The output of the mixer 50 is connected to the input oaf band-pass filter 70, a circuit element also well known in the art. The output of the mixer 50 includes a slow wave oscillating circuit frequency, a local oscillator frequency, and the sum of and the difference of these frequencies. For example, in the example shown above, it would include nine to eleven megahertz frequency from sensing element 30, nine megahertz from the local oscillator 60, eighteen to twenty megahertz, and zero to two megahertz, all as part of output of mixer 50.

Here, the band-pass past filter 70 is connected to the output of mixer 50. This band-pass filter 70 is set to pass only, for example, zero to two megahertz or 0.50 to 2.50 megahertz as discussed above. Accordingly, the band-pass filter 70 will be the only substantial frequency signal remaining. Alternatively, in this example, a low pass filter could be used in place of the band pass filter. A frequency-to-voltage converter 80, which is an element known in the art, could receive the output of the band-pass filter 70 and scale to provide a zero-to-five or zero-to-ten volt output 90. Alternatively, the frequency converter 80 may be a frequency-to-current converter, which is an element known in the art, which would then be scalable directly to the standard four to twenty milliamp output 90, which would be, for example, especially convenient if the output of the mixer 50 and band-pass filter 70 were to include a 0.50 and 2.50 megahertz signal.

Other applications of this method and apparatus may be made. Accordingly, because many varying and different embodiments may be made within the scope of inventive concepts herein taught including equivalent structures of materials hereafter thought of, and because many modifications may be made in the embodiments herein detailed in accordance with descriptive requirements of the law, it is to be understood that the details herein are to be interpreted as illustrative and not in a limiting sense.

What is claimed is:

1. A sensor unit for measuring changes in a parameter being sensed, comprising:

a slow wave structure including (1) a slow wave structure sensitive element positioned and structured to be responsive to changes in the parameter and (2) a slow wave structure oscillating circuit having said slow wave structure sensitive element as a component, the changes of the parameter resulting in variations in said slow wave sensitive element affecting the operating frequency of said slow wave structure oscillating circuit;

said output frequency of said slow wave structure, being said operating frequency of said slow wave structure oscillating circuit;

a mixer circuit, said output frequency of said slow wave structure being an input into said mixer circuit;

a local oscillator, said local oscillator generating at least one output frequency, said output frequency of said local oscillator circuit being a second input to said mixer circuit;

said mixer circuit producing a difference signal equal to at least the difference between said output frequency of said slow wave structure minus said output frequency of said local oscillator circuit.

2. The sensor unit of claim 1, wherein said slow wave structure oscillating circuit frequency is in a range that centers around a fixed center frequency.

3. The sensor unit of claim 2, wherein said local oscillator circuit frequency is substantially equal to said center frequency.

4. The sensor unit of claim 2, wherein said local oscillator circuit frequency is substantially the lowest frequency of said range.

5. The sensor unit of claim 2, wherein said local oscillator circuit frequency is offset from the substantially lowest frequency of said range.

6. The sensor unit of claim 1, wherein said local oscillator frequency is crystal controlled.

7. The sensor unit of claim 1, wherein said local oscillator frequency is ceramic filter controlled.

8. The sensor unit of claim 1, wherein said local oscillator frequency is R/C filter controlled.

9. The sensor unit of claim 1, wherein said slow wave structure oscillating circuit uses a feedback element and said feedback element includes said slow wave structure sensitive element.

10. The sensor unit of claim 1, wherein there is included a filter set to select a range of frequencies from the input frequencies to said filter as the output from said filter, said mixer circuit output being the input to said filter.

11. The sensor unit of claim 10, wherein there is further included a frequency-to-voltage converter, said band-pass filter output being an input to said frequency-to-voltage converter and is converted proportionally from said input frequency to a voltage output.

12. The sensor unit of claim 10, wherein there is further included a frequency-to-current converter, said band-pass filter output being an input to said frequency-to-current converter and is converted proportionally from said input frequency to a current output.

13. The sensor unit of claim 10, wherein said filter is a band-pass filter.

14. The sensor unit of claim 10, wherein said filter is a low-pass filter.

15. A method for measuring changes in a parameter, comprising the steps of:

a. measuring the changes in parameter with a slow wave structure sensitive element;

b. causing the change in the parameter to be expressed as an oscillation frequency in an oscillating circuit;

c. generating a fixed frequency;

d. mixing said oscillation frequency with said fixed frequency in a mixing circuit, said mixing producing a different signal equal to at least the difference between said oscillation frequency resulting from the change in the parameter minus said fixed frequency.

16. The method of claim 15, wherein the generating of Step C is of a fixed frequency at the low end of the range of said oscillation frequencies caused to occur as a result of the change in parameter.

17. The method of claim 16, wherein said mixing causes the frequency range of said oscillation frequencies caused to occur resulting from the changes in the parameter to start substantially at zero.

* * * * *